Nov. 8, 1955 P. HUTT 2,723,317
PUSH BUTTON SWITCH
Filed Jan. 18, 1954 2 Sheets-Sheet 1
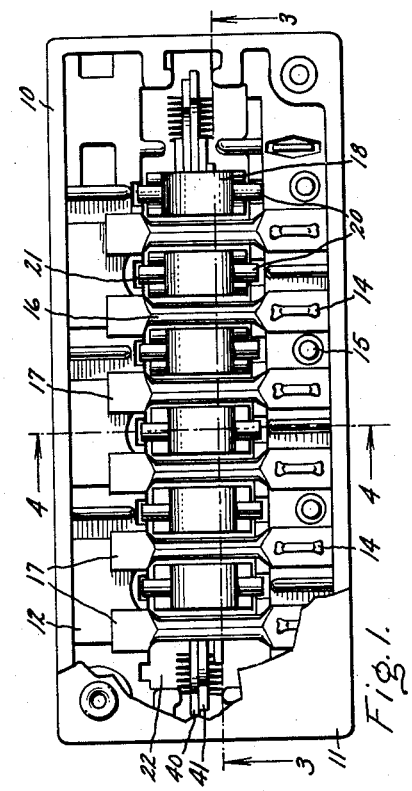
Fig. 1.
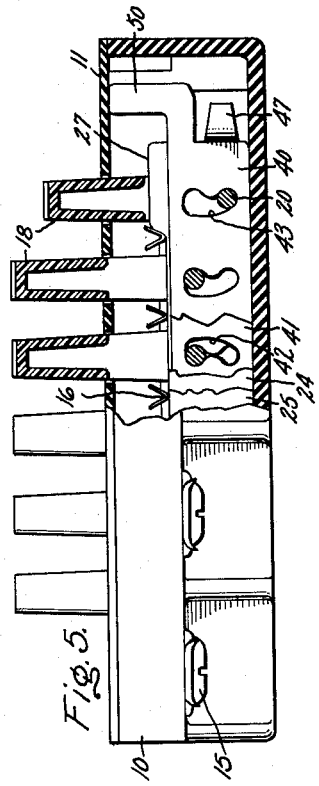
Fig. 5.
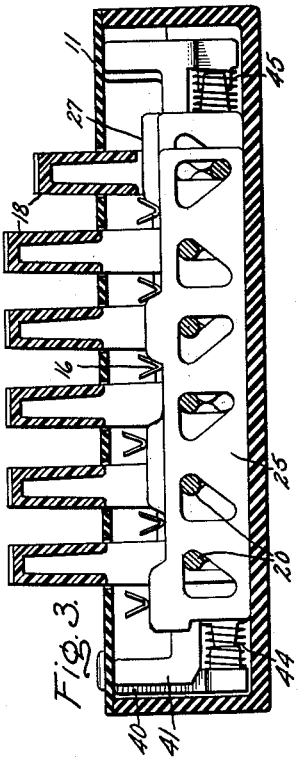
Fig. 3.
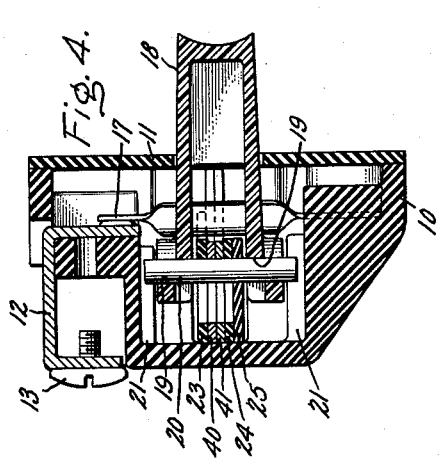
Fig. 4.
Fig. 2.
Inventor
Philip Hutt
by
His Attorney

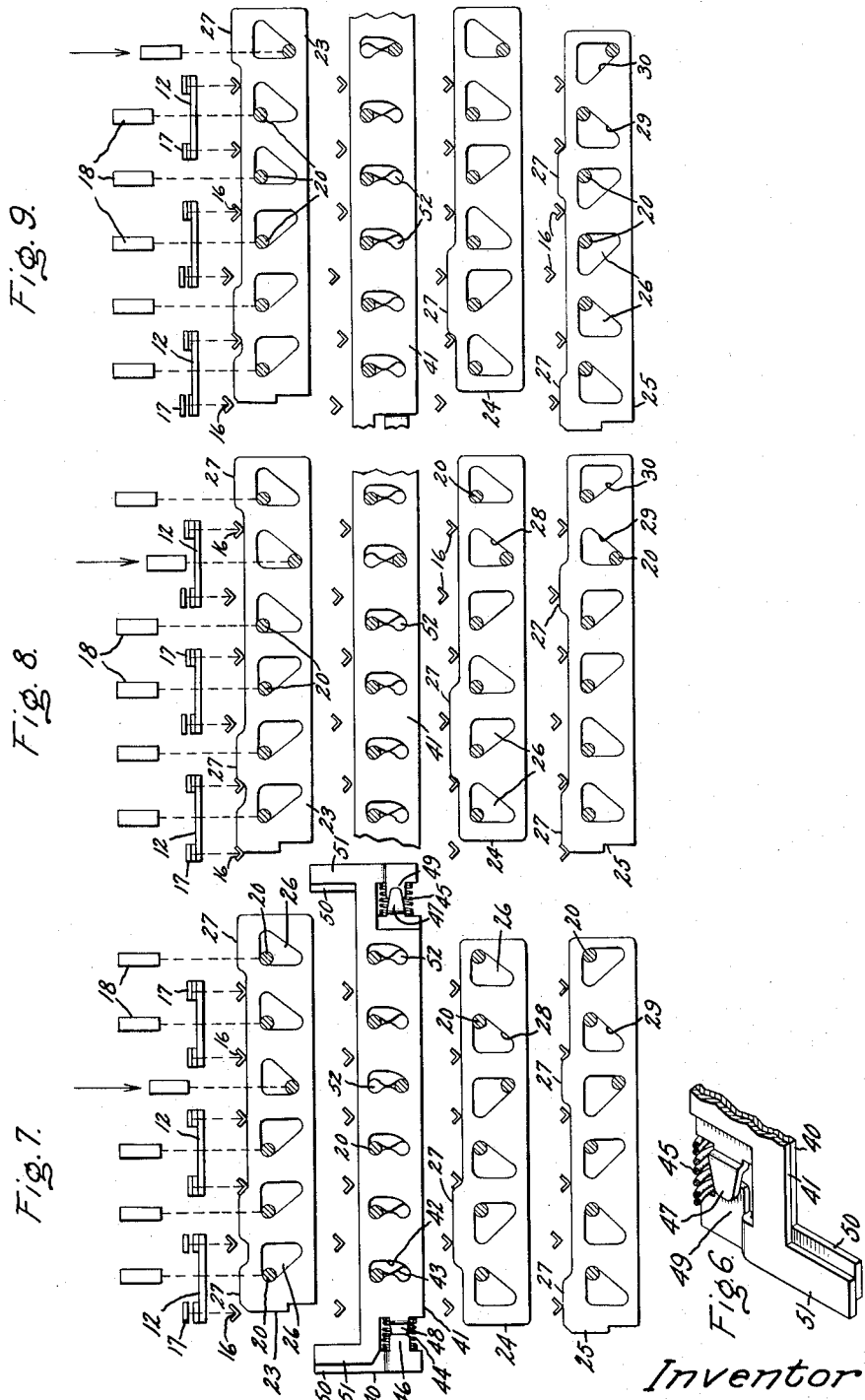

United States Patent Office 2,723,317
Patented Nov. 8, 1955

2,723,317

PUSH BUTTON SWITCH

Philip Hutt, Milford, Conn., assignor to General Electric Company, a corporation of New York Application January 18, 1954, Serial No. 404,627

8 Claims. (Cl. 200—5)

The present invention relates to a push button switch of the type which includes a plurality of push buttons for actuating slides to effect closing of one or more pre-selected electric circuits upon the actuation of one of the push buttons and simultaneously preventing the operation of a second push button through suitable interlocking mechanisms.

This invention is an improvement in the push button switch of the type exemplified by the Andrews Pat. No. 2,431,904 which is assigned to the same assignee as in the present invention. The push button switch of the Andrews patent has been widely accepted and extensively used for many years for controlling the heating elements of electric ranges.

It has been recognized, however, that such switches are also adapted for the control of other types of electrical equipment, especially where multiple circuits are involved. For example, switches of this type may be used in certain equipment involving motor driven apparatus.

In such applications, it is frequently necessary that control switches be arranged so that the controlled circuits cannot be inadvertently opened and immediately reclosed. A situation of this kind may for instance be involved where a controlled motor is used to drive apparatus so arranged that the motor, when its supply circuit is opened, stops under load and cannot be restarted without undesired operation of circuit protective means unless the load is first disconnected from the motor.

An example of such an application is found in the control of refrigerating compressors as used in air conditioning equipment which may involve a plurality of electric circuits to be controlled. A multiple button switch of the general type of the switch described in the above-mentioned Andrews Pat. No. 2,431,904 is well adapted for such use to select various operating conditions of the equipment. When the air conditioner is used merely for movement of air (into or out of a room), one or more fans are operated. If it is desired to cool the room, then a compressor for the refrigerant must be connected in the operating system. It is an inherent characteristic in some of the room air conditioning equipment now on the market that once the motor for driving the compressor is stopped, it cannot immediately be restarted until an appreciable time has elapsed, in the order of one or two minutes. During this lapse of time, the pressure of the refrigerant on both sides of the compressor is being equalized by a bleeder system. If an attempt is made to restart the compressor immediately after it has been stopped, the compressor motor will stall due to an excessive overload and the circuit protective fuse or breaker will open.

Operating instructions ordinarily furnished with such equipment caution the operator against trying to restart the compressor too soon after it has been stopped. However, it is desirable that control switch mechanisms for such equipment be arranged to prevent the possibility of inadvertent opening of the compressor motor circuit and its automatic, immediate reclosing.

A difficulty encountered in attempting to use a switch of the type described in the aforesaid Andrews Pat. No. 2,431,904 for the control of certain room air conditioning equipment is that such a switch permits the inadvertent opening of its circuits followed by an immediate, automatic reclosing. A light pressure on any of the push buttons other than the one previously depressed is transferred by the mechanism into a force directed toward opening the electrical circuits. When this pressure is released, the circuits would immediately reclose. When initial tests were made with such a switch on a room air conditioner, a casual pressure on the buttons could open the compressor motor circuit and then permit it to close again with the result that the motor would be in a stalled condition, thereby operating the circuit protective means to open the circuit. Obviously, this condition could not be tolerated.

Accordingly, the principal object of this invention is to provide a positive action in the nature of a snap action for each of the buttons of a push button switch of the class described.

A further object is to provide, in a push button switch, detent sliders which act to increase the resistance to the downward movement of each of the buttons of a push button switch.

A still further object is to provide a suitable spring means for the detent sliders of a push button switch so that equal resistance is provided to the downward movement of each of the buttons of a push button switch.

The present invention as herein described is embodied in a push button switch comprising a hollow housing of insulating material, stationary contacts secured in the housing, and movable contacts cooperatively associated with the stationary contacts. There are a plurality of parallel spring strips secured at one of their ends to the housing and supporting the movable contacts at their free ends. A plurality of slides are arranged longitudinally within the housing and below the spring strips so that they are seated on the bottom wall of the housing. Each slide is provided with one or more cam surfaces on its upper edge for alternately engaging certain of the said spring strips to effect the opening and closing of the respective contacts in certain operating positions of the slides. A plurality of apertures with diagonal working surfaces are formed in each slide and a plurality of push buttons project into the housing and are associated with the apertures of the slides by a vertically-guided pin which is supported transversely on the bottom of each push button. Specifically, the transversely-extending pins of each push button are arranged to cooperate with the diagonal working surfaces to operate the slides to selected operating positions.

The specific invention disclosed herein provides a means to increase the resistance to the downward movement of each of the push buttons of the switch. This means comprises a pair of detent sliders sandwiched between the before-mentioned slides. Each detent slider has a series of similar but oppositely-shaped apertures generally in alignment with the apertures of the slides so that the actuating pins of the push buttons extend through the apertures of both the slides and the detent sliders. Longitudinally-arranged coil springs are mounted on the ends of the detent sliders beyond the ends of the said slides to normally move the apertures of the sliders out of alignment with each other. The apertures of one slider partially overlie the apertures of the other slider so that the resulting apertures through the sliders comprise generally circular upper and lower portions to accommodate the pins of the push buttons. When a button is depressed, the actuating pin connected thereto wedges itself between the relatively movable side edges of the resulting aperture through the sliders against the action of the coil springs. With this arrangement, resistance is provided against the depression of a push button such that when the contacts on the spring strips begin to open and/or close, they move with a positive action in the nature of a snap action while at the same time the pin of a previously depressed push button moves from the lower portion to the upper portion of its aperture.

My invention will be better understood from the following description taken in connection with the accompanying drawings, and its scope will be pointed out in the appended claims.

In the drawing:

Fig. 1 is a top plan view of a push button switch embodying my invention with the greater portion of the cover plate removed.

Fig. 2 is a bottom plan view of the push button switch of Fig. 1.

Fig. 3 is a cross-sectional side elevational view taken on the line 3—3 of Fig. 1.

Fig. 4 is a transverse cross-sectional elevational view of the push button switch embodying my invention taken along the lines 4—4 of Fig. 1.

Fig. 5 is a partial sectional side elevational view taken between the pair of detent sliders of Fig. 1.

Fig. 6 is a partial isometric view showing the interengagement between the ends of the two detent sliders.

Figs. 7 through 9 inclusive are diagrammatic views of certain parts of the switch in different operating positions.

Referring in detail to the drawings, 10 represents a hollow switch housing of insulating material. The top opening of housing 10 is closed by a thin cover plate 11 which is fastened to the housing by means of rivets or screws or other suitable means. A plurality of stationary contacts 12 are spaced along one side wall of the housing and extend through the wall of the housing to the outer surface of the bottom wall of the housing where they are provided with terminal screw means 13 as seen in Figure 4. On the opposite side wall of the housing are also provided a plurality of stationary contacts 14 which are joined in pairs on the outer surface of the bottom wall of the housing, each adjacent pair of contacts 14 being joined together at the back of the switch housing and there provided with a single terminal screw 15 which may be seen on the back of the switch housing in Fig. 2. Secured to each of the stationary contacts 14 are spring strips 16 which in the present adaptation are six in number. The central portions of these spring strips 16 are creased longitudinally of the strips so that they are V-shaped in cross-section. The free ends of the spring strips 16 are provided with movable contact portions 17 which are adapted to engage the stationary contacts 12.

Push buttons 18, of which there are six, are mounted in the housing 10 between the spring strips 16. The bottom portions of the push buttons 18 are bifurcated for a reason which will be explained later. The bifurcated ends of the buttons are provided with spaced bores 19 for receiving a pin 20. The ends of each pin 20 are guided for vertical movement within oppositely disposed grooves or channels 21 which are formed in the walls of the housing.

Longitudinally arranged within the housing 10 is a channel 22 for accommodating a plurality of slides of insulating material, in the present instance three, which are numbered as 23, 24, and 25. Formed in each of these slides are a plurality of apertures 26, one of which is arranged below each push button. These apertures 26 are substantially in the shape of right triangles. The only differences between them are that in some of the apertures the hypotenuse of the right triangle is inclined to the right, and in others it is inclined to the left. They are, however, similar in size and in shape. The lower surface of these slides 23, 24, and 25 rests squarely on the bottom wall of the housing. Before, it was mentioned that the lower end of each button 18 was bifurcated and provided with a pin 20 which extended transversely of the switch housing 10. The buttons 18 are bifurcated so that they may fit over the slides 23, 24, and 25 and straddle them. The central portions of the pins 20 extend through the apertures 26 of the slides, as can be clearly seen in Figs. 7, 8, and 9. On the top edge of each of the slides cam surfaces 27 are arranged, the actions of which are to be described hereinafter.

In Fig. 7, the six push buttons 18 are arranged at the top of the figure with the third button from the right being depressed. The pins 20 are shown in their proper positions within the apertures 26 of the slides 23, 24, and 25. Also, the central V-shaped portions of the spring strips 16 are shown as being positioned above the slides 23, 24, and 25. The stationary contacts 12 are also shown in their proper positions, while the movable contacts 17 are shown as being connected to the spring strips 16.

When the conditions of Fig. 7 are changed, as shown in Fig. 8, by depressing the second push button from the right of the grouping shown, it should be understood that the pin 20 connected to that button will ride down the inclined surfaces 28 and 29 of the apertures 26 in the slides 24 and 25, respectively, to move the last two mentioned slides to the right. Since the pin 20 does not engage any diagonal surface of the apertures 26 in the slide 23, that slide will remain stationary. When comparing the relative positions of the slides 24 and 25 in Figs. 7 and 8, particular attention should be given to the changes in the relative positions of the spring strips 16 and the cam surfaces 27 which bring about the switching of the movable contacts 17 relative to the stationary contacts 12.

Turning now to Fig. 9, the last push button at the right of the grouping has been depressed. The pin 20 acts on the diagonal surface 30 of the slide 25 to move the slide 25 to the left, while the slides 23 and 24 remain stationary. Again, the relative positions of the movable contacts 17 and the stationary contacts 12 have been changed. It should be noted that when a push button 18 is depressed while there is already a button in the depressed position, the depressed button will automatically move upwardly as soon as a different button is depressed. For example, looking at Figs. 8 and 9, in Fig. 8 the button which is second from the right end is in the depressed position. In Fig. 9, when the right-hand button is depressed, the slide 25 will move to the left. As it moves to the left, the pin 20 below the button that is second from the right end and which is already in the depressed position will move up the inclined surface 29. This relationship always holds true in the present push button switch. It will be seen that only one button at a time may be fully depressed. If an attempt is made to depress more than one button at a time, each button will be depressed only part way before the action of the slides prevents any further movement. Contact strips affected by the partial movement of the slides involved will generally be moved to open circuit position.

The structure which I have briefly described above is generally the structure of push button switches which are being made in large quantities for electric range applications at the present time. This structure is substantially the same as that which is disclosed in the before-mentioned Andrews Pat. No. 2,431,904. As will be appreciated by one skilled in this art, the major resistance to the downward movement of the buttons 18 that is provided by the structure that has been disclosed above is provided by the spring action in the spring strips 16. Therefore, it is possible to depress a single push button and momentarily open the contacts 17, and if the force on the button is removed, the contacts will close again. It is therefore necessary that this characteristic be removed from this switch in order that it may be used on certain types of room air conditioning units now on the market. The following structure has been built into this switch so as to provide a simulated snap action to the downward movement of the push buttons.

Detent sliders 40 and 41 are sandwiched between the slide 23 and the slides 24 and 25. An equally spaced series of identical irregular-shaped apertures 42 are arranged in detent slider 41, while a similar, but a reversed series of apertures 43 are arranged in the detent slider 40. These apertures 42 and 43 are arranged substantially in alignment with the apertures 26 of slides 23, 24, and 25. Likewise, pins 20 of the push buttons 18 extend through the apertures of both the slides and the sliders. The sliders 40 and 41 are manufactured as identical parts, but they are assembled by reversing one of them. Since the sliders 40 and 41 are made identical and are assembled by reversing one of them, the apertures 42 and 43 overlie each other to form symmetrically shaped resulting apertures 52. Resulting apertures are here defined as the apertures through the sliders 40 and 41 which are formed by the cooperation between the apertures 42 and 43 of the sliders 40 and 41 respectively. Since the apertures 42 and 43 are alike but in reversed relation to each other, the resulting apertures are neither the shape of aperture 42 or the shape of aperture 43. They are, however, a compromise between the two shapes. When the two detent sliders are placed in sliding contact with each other with the pins 20 extending through the apertures 42 and 43, coil springs 44 and 45 are assembled longitudinally at the ends of the sliders. Of course, it should be recognized that it is not necessary to mount the spring means on the end of the detent sliders, for they could just as well be mounted between each end of the sliders and the walls of the housing and still perform the same function. The arrangement shown on these drawings is, however, the preferred embodiment. On each end of the detent sliders is formed a tongue which acts as the spring seat for the springs 44 and 45. For instance, on the ends of slider 40 are provided an inwardly facing tongue 46 and an outwardly facing tongue 47. Likewise, on the ends of the slider 41 are provided an outwardly extending tongue 48 and an inwardly extending tongue 49. As can be seen in Fig. 7, the coil spring 44 is seated between the tongues 46 and 48, while the coil spring 45 is seated between the tongues 47 and 49. In order to avoid any interference between the tongues 46 and 48 and the tongues 47 and 49 respectively, they are laterally offset so that they lie within the plane of the other slider. By that is meant that the tongues 48 and 49 of the detent slider 41 are offset so that they lie within the plane of the slider 40, while the tongues 46 and 47 of the slider 40 lie within the plane of the slider 40.

The springs 44 and 45 are so arranged that they tend to move the sliders relative to each other in order to close the resulting apertures. The resulting apertures are held open by the presence of the pins 20 mounted therein. This is one extreme position of the sliders, and in this position each resulting aperture through the sliders comprises upper and lower portions which are generally circular in shape so that the overall shape is similar to a figure eight. The other extreme position is brought about while a push button is depressed thereby forcing the pin 20 of that particular push button to wedge itself between the opposed side edges of the apertures 42 and 43 so that the resulting aperture is substantially in the shape of a rectangle to allow the pin 20 to drop into the lower portion of the resulting aperture.

Arranged vertically on the ends of the sliders 40 and 41 are upstanding projections 50 and 51 respectively. The purpose of these projections is to prevent the sliders 40 and 41 from moving vertically within the housing 10 due to a force being exerted by one of the upwardly moving pins 20. These projections 50 and 51 engage the underside of the cover plate 11 and are prevented from any undesirable vertical movement.

From this description, it should be clear that resistance to the downward movement of the pins 20 and, therefore, the push buttons 18 is provided by the detent sliders 40 and 41. When the pin 20 moves from the upper portion of the resulting aperture to the lower portion, it spreads the sliders against the action of the springs 44 and 45 while at the same time allowing the pin 20 of the push button already in the depressed position to rise vertically to its uppermost position. The resulting apertures formed through the sliders 40 and 41 are normally in the shape of a figure eight with an upper circular portion and a lower circular portion. This is clearly seen in Figs. 7 through 9 of the drawings. The apertures 42 and 43 through the sliders 40 and 41 are provided along opposite side edges with a convex projection so that there is no undue obstruction to the free movement of the pins 20 between the moving side edges of the resulting apertures.

It is important in the construction of a push button switch according to this invention that the apertures 42 and 43 be carefully located within the sliders 40 and 41 so that there is equal resistance to the movement of each of the pins 20 of the push buttons 18.

When a push button of this switch is depressed, a force of nearly five pounds must be exerted before the contacts 17 will begin to open and/or close. When the contacts do begin to move, the force necessary to depress the button has already passed the maximum amount required and button is quickly moving to its bottom position so that it is difficult to stop the movement of the button before it comes to rest at its lowest position. It requires a large initial force to start the downward movement of a button. This force will build up slightly, and then it will fall off until the button reaches the end of its descent. After the pin 20 moves downwardly beyond the midsection of the resulting aperture, there is no more resistance to the downward movement of the pin provided by the sliders 40 and 41. If a graph were drawn plotting force versus downward movement of the push button, the curve would begin high up on the ordinate and would rise slightly as force is applied to the button until it reaches a maximum, then it would fall off steadily. After the curve begins to drop, the point is reached in the operation of this switch where the contacts 17 begin to open and/or close.

Consequently, having described my invention of an improved push button switch having novel detent sliders, it will be readily apparent to those skilled in this art that I have provided a switch which is simple in design and reliable in operation. In addition, the parts are easy to manufacture and assemble at low cost.

Modifications of this invention will occur to those skilled in the art, and it is to be understood, therefore, that this invention is not limited to the particular embodiment disclosed, but that it is intended to cover all modifications which are within the true spirit and scope of this invention.

What I claim as new and desire to secure by Letters Patent in the United States is:

1. In a push button switch comprising a hollow housing, contact means including stationary contacts secured in said housing, movable contacts cooperatively associated with the stationary contacts, and a plurality of spring strips secured to the housing and supporting the movable contacts, a plurality of slides disposed within the housing and seated therein, each slide being provided with one or more cam surfaces for alternately engaging certain of the said spring strips to effect the opening and closing of the respective contacts in certain operating positions of the slides, each slide having a plurality of apertures with diagonal working surfaces, means for actuating the slides including a plurality of push buttons projecting into the housing and each having a guided pin projecting through an aperture of each slide and positioned to engage certain of said working surfaces to operate the slides to selected operating positions; the invention comprising means to increase the initial resistance to the inward movement of each of the said push buttons so as to provide them with a simulated snap action including a pair of detent sliders having opposed parallel faces and non-symmetrical apertures generally in alignment with the apertures of the slides so that the said actuating pins of the push buttons extend through the apertures of both the slides and the detent sliders, spring means in said housing normally tending to move the apertures of the detent sliders out of alignment with each other, the apertures in the detent sliders being so shaped that each resulting aperture through the sliders is substantially in the shape of a figure eight, whereby when a push button is depressed the attached pin will move inwardly to enlarge the resulting aperture through the sliders to move the sliders relative to each other against the action of the said spring means, while at the same time any pin already in the lower portion of its aperture will move to the upper portion of its aperture due to the cam action of the diagonal working surfaces of the slides.

2. In a push button switch comprising a hollow housing, contact means including stationary contacts secured in said housing, movable contacts cooperatively associated with the stationary contacts, and a plurality of spring strips secured to the housing and supporting the movable contacts, a plurality of slides disposed within the housing and seated therein, each slide being provided with one or more cam surfaces for alternately engaging certain of the said spring strips to effect the opening and closing of the respective contacts in certain operating positions of the slides, each slide having a plurality of apertures with diagonal working surfaces, means for actuating the slides including a plurality of push buttons projecting into the housing and each having a guided pin projecting through an aperture of each slide and positioned to engage certain of said working surfaces to operate the slides to selected operating positions; the invention comprising means to increase the initial resistance to the inward movement of each of the said push buttons so as to provide them with a simulated snap action including a pair of detent sliders having opposed parallel faces, a plurality of irregularly shaped apertures formed in both of the detent sliders to be generally in alignment with the apertures of the said slides, the apertures of one detent slider partially overlying the apertures in the other detent slider so that the resulting apertures through the detent sliders comprise upper and lower portions, each portion being substantially the size of the pins of the push buttons which are adapted to be located therein, spring means mounted on the ends of the detent sliders to urge them into gripping engagement with the pins of the push buttons, whereby when a push button is depressed the pin of the button moves the detent sliders relative to each other against the action of the said spring means to enlarge the sizes of the resulting apertures through the detent sliders until the pin drops into the lower portion of the resulting aperture.

3. In a push button switch comprising a hollow housing, contact means including stationary contacts secured in said housing, movable contacts cooperatively associated with the stationary contacts, and a plurality of spring strips secured to the housing and supporting the movable contacts, a plurality of slides disposed within the housing and seated therein, each slide being provided with one or more cam surfaces for alternately engaging certain of the said spring strips to effect the opening and closing of the respective contacts in certain operating positions of the slides, each slide having a plurality of apertures with diagonal working surfaces, means for actuating the slides including a plurality of push buttons projecting into the housing and each having a guided pin projecting through an aperture of each slide and positioned to engage certain of said working surfaces to operate the slides to selected operating positions; the invention comprising means to increase the initial resistance to the inward movement of each of the said push buttons so as to provide them with a simulated snap action including a pair of detent sliders having opposed parallel faces and irregularly shaped apertures generally in alignment with the apertures of the slides so that the actuating pins of the push buttons extend through the apertures of both the slides and the detent sliders, the apertures of one detent slider partially overlying the apertures of the other detent slider so that the resulting apertures through the detent sliders comprise generally circular upper and lower portions to accommodate the pins of the push buttons, spring means mounted longitudinally on the ends of the detent sliders to urge them relative to each other so that the edges of the apertures of the detent sliders are in gripping engagement with the pins of the push buttons, whereby when a push button is depressed, the pin of the button moves the detent sliders against the action of the spring thereby enlarging the resulting apertures through the detent sliders so that the pin may move into the lower portion of its aperture, while at the same time the pin of a previously depressed push button moves from the lower portion to the upper portion of its aperture through the detent sliders due to the cam action of the diagonal working surfaces of the slides.

4. In a push button structure as recited in claim 3 wherein the said spring means comprise coil springs, and each end of both detent sliders is provided with a spring seat in the form of a longitudinally extending tongue over which the coil springs are mounted, the tongues of the same detent slider facing in the same direction, with the tongues of one detent slider being opposed to the tongues of the other detent slider, and all of the tongues being offset to lie within the plane of the adjacent detent slider.

5. In a push button switch comprising a hollow housing, contact means including stationary contacts secured in said housing, movable contacts cooperatively associated with the stationary contacts, and a plurality of spring strips secured to the housing and supporting the movable contacts, a plurality of slides disposed within the housing and seated therein, each slide being provided with one or more cam surfaces on its upper edge for alternately engaging certain of the said spring strips to effect the opening and closing of the respective contacts in certain operating positions of the slides, each slide having a plurality of apertures with diagonal working surfaces, means for actuating the slides including a plurality of push buttons projecting into the housing and each having a guided pin projecting through an aperture of each slide and positioned to engage certain of said working surfaces to operate the slides to selected operating positions; the invention comprising means to provide a simulated snap action to the inward movement of each of the said push buttons comprising a pair of detent sliders grouped with the said slides, each slider having irregularly shaped apertures substantially in alignment with the apertures of the said slides so that the pins of the push buttons extend through the apertures of both the slides and the detent sliders, spring means mounted longitudinally on the ends of the sliders beyond the ends of the said slides to urge the sliders to move relative to each other, each of the resulting apertures through the sliders in one extreme position being divided into an upper and a lower portion which are separated from each other by a pair of opposing convex projections, the said projections being formed centrally on the side edges of the resulting apertures, whereby when a push button is depressed, the pin of the button wedges itself between the said convex projections to move the detent sliders against the resistance of the springs so that the pin slides between the projections and into the lower portion of the resulting aperture through the sliders.

6. In a push button switch comprising a hollow housing, contact means mounted in said housing for controlling the operation of a plurality of circuits, a plurality of slides disposed within the housing, each slide being provided with one or more cam surfaces for operating the said contacts, each slide having a plurality of apertures with diagonal working surfaces, means for actuating the slides including a plurality of push buttons projecting into the housing and each having a pin projecting through an aperture of each slide and positioned to engage certain of said working surfaces to operate the slides to selected operating positions; the invention comprising means to provide a simulated snap action to the inward movement of each of the said push buttons comprising a pair of detent sliders grouped with the said slides, each slider having irregularly shaped apertures substantially in alignment with the apertures of the said slides so that the pins of the push buttons extend through the apertures of both the slides and the detent sliders, spring means within the said housing to urge the sliders to move relative to each other, each of the resulting apertures through the sliders in one extreme position being divided into an upper and a lower portion which are separated from each other by a pair of opposing convex projections, the said projections being formed centrally on the side edges of the resulting apertures, whereby when a push button is depressed, the pin of the button wedges itself between the said convex projections to move the detent sliders against the resistance of the springs so that the pin slides between the projections and into the lower portion of the resulting aperture through the sliders.

7. A push button switch comprising a switch housing in which the buttons operate laterally movable slides having inclined surfaces coacting with pin-like members at the base of each of the buttons for controlling the operation of the switch contacts, and means to increase the initial resistance to the inward movement of each of the said push buttons so as to provide them with a simulated snap action, said means including a pair of detent sliders having opposed parallel faces and non-symmetrical apertures generally in alignment with the inclined surfaces on the movable slides so that the said pin-like members act upon the inclined surfaces of the movable slides as well as on the edges of the apertures in the detent sliders, spring means within said housing normally tending to move the apertures of the detent sliders out of alignment with each other, the apertures in the detent sliders being so shaped that each resulting aperture through the sliders is substantially in the shape of a figure eight, whereby when a push button is depressed the pin-like member will move inwardly to enlarge the resulting aperture through the detent sliders to move them relative to each other against the action of the said spring means, or at the same time any button already in the depressed position will move outwardly due to the cam action of the inclined surfaces of the slide so that there can be only one button fully depressed at any one operative position of the switch.

8. A multiple push button switch comprising a switch housing of insulating material in which the button operates laterally movable slides having inclined surfaces coacting with pin-like members at the base of each of the buttons for controlling the operation of the switch contacts, and means to provide a simulated snap action to the inward movement of said push buttons, said means including a pair of detent sliders grouped with the said slides, each slider having irregularly shaped apertures substantially in alignment with the inclined surfaces of the said slides so that the said pin-like members act upon the inclined surfaces of the movable slides as well as on the edges of the apertures in the detent sliders, spring means mounted longitudinally on the ends of the sliders beyond the ends of the said slides to urge the sliders relative to each other, each of the resulting apertures through the sliders in one extreme position being divided into an upper and a lower portion which are separated from each other by a pair of opposing convex projections, the said projections being formed centrally on the side edges of the resulting apertures, whereby when a push button is depressed, the pin-like member on the bottom thereof wedges itself between the said convex projections to move the detent sliders against the resistance of the spring means so that the pin-like members slide between the projections and into the lower portion of the resulting aperture through the sliders.

References Cited in the file of this patent
UNITED STATES PATENTS 2,431,904    Andrews _____ Dec. 2, 1947